US007323032B2

United States Patent
Hayashi et al.

(10) Patent No.: US 7,323,032 B2
(45) Date of Patent: Jan. 29, 2008

(54) PYROCHEMICAL REPROCESSING METHOD FOR SPENT NUCLEAR FUEL

(75) Inventors: Hiroshi Hayashi, Tokai-mura (JP); Tsutomu Koizumi, Tokai-mura (JP); Tadahiro Washiya, Tokai-mura (JP); Kenji Koizumi, Tokai-mura (JP)

(73) Assignee: Japan Nuclear Cycle Development Institute, Ibaraki (JP)

( * ) Notice: Subject to any disclaimer, the term of this patent is extended or adjusted under 35 U.S.C. 154(b) by 770 days.

(21) Appl. No.: 10/857,013

(22) Filed: Jun. 1, 2004

(65) Prior Publication Data

US 2007/0163386 A1    Jul. 19, 2007

Related U.S. Application Data

(62) Division of application No. 10/051,047, filed on Jan. 22, 2002, now Pat. No. 6,793,894.

(30) Foreign Application Priority Data

May 25, 2001    (JP)    ............................. 2001-157410

(51) Int. Cl.
    C22B 60/02    (2006.01)
    C01G 56/00    (2006.01)
(52) U.S. Cl. ............................. 75/393; 423/3
(58) Field of Classification Search ............ 423/4, 423/5; 75/393
    See application file for complete search history.

(56) References Cited

U.S. PATENT DOCUMENTS

| | | | | |
|---|---|---|---|---|
| 2,902,415 A | * | 9/1959 | Niedrach et al. | 205/47 |
| 3,900,695 A | | 8/1975 | Andersson et al. | 373/152 |
| 4,049,384 A | | 9/1977 | Wenckus et al. | 117/203 |
| 4,341,915 A | | 7/1982 | Adachi et al. | 373/22 |
| 4,459,153 A | * | 7/1984 | Mullins et al. | 75/397 |
| 4,880,506 A | * | 11/1989 | Ackerman et al. | 205/44 |
| 5,022,044 A | | 6/1991 | Thomas | 373/151 |
| 5,041,193 A | * | 8/1991 | Grantham | 205/43 |
| 5,147,616 A | * | 9/1992 | Ackerman et al. | 423/5 |
| 5,202,100 A | * | 4/1993 | Nagel et al. | 423/5 |
| 5,582,706 A | * | 12/1996 | Grantham et al. | 205/43 |
| 5,901,169 A | | 5/1999 | Kobayashi | 373/142 |

* cited by examiner

Primary Examiner—Roy King
Assistant Examiner—Ngoclan T. Mai
(74) Attorney, Agent, or Firm—Westerman, Hattori, Daniels & Adrian, LLP.

(57) ABSTRACT

This invention is provided for improvement of corrosion-resistant property of a crucible and for promotion of safety in a pyrochemical reprocessing method for the spent nuclear fuel. The spent nuclear fuel is dissolved in a molten salt placed in the crucible. In a pyrochemical reprocessing method, the nuclear fuel is deposited, and the crucible (2) is heated by induction heating. Cooling media (5, 6) are supplied to cool down, and a molten salt layer (7) is maintained by keeping balance between the heating and the cooling, and a solidified salt layer (8) is formed on inner wall surface of the crucible.

3 Claims, 6 Drawing Sheets

An example of temperature distribution when the molten layer is formed

An example of electromagnetic force distribution in the molten salt (Maximum value = 284 N/m$^3$)

PYROCHEMICAL REPROCESSING METHOD FOR SPENT NUCLEAR FUEL

This is a divisional of application Ser. No. 10/051,047 filed Jan. 22, 2002, now U.S. Pat. No. 6,793,894.

BACKGROUND OF THE INVENTION

The present invention relates to a pyrochemical reprocessing method of spent nuclear fuel used in atomic reactor and to an induction heating system used in the pyrochemical reprocessing method.

Studies have been performed, both domestic and abroad, on recycling method to improve economic feasibility of nuclear fuel cycle, by which the spent nuclear fuel is reprocessed by pyrochemical reprocessing method using molten salt and uranium or plutonium and the spent fuel is collected and recycled.

In the pyrochemical reprocessing of oxide fuel, spent nuclear fuel is dissolved in a molten salt, and oxides of uranium or plutonium in granular state are deposited and are collected by electrolysis. Principal processes are as follows:
Chlorination dissolving process of spent fuel:

$$:UO_2+Cl_2 \rightarrow UO_2Cl_2$$

$$:PuO_2+C+Cl_2 \rightarrow PuCl_4+CO_2$$

Electrolysis and collecting process of uranium oxide (cathode)

$$UO_2Cl_2 \rightarrow UO_2+Cl_2$$

Precipitating and collecting process of plutonium oxide $$PuCl_4+O_2 \rightarrow PuO_2+2Cl_2$$

The crucible used for reprocessing is made of pyrographite, and it exerts action as an anode in the electrolysis and depositing process.

In the pyrochemical reprocessing method for metal fuel, spent nuclear fuel is dissolved in a molten salt. Metal uranium or metal plutonium are deposited and are collected by electrolysis. Principal processes are as follows:
Dissolving processing of spent fuel:

$$U \rightarrow U^{3+}+3e^-; Pu \rightarrow Pu^{3+}+3e^-$$

Electrolysis and collecting process of metal uranium (solid cathode):

$$U^{3+}+3e^- \rightarrow U$$

Electrolysis and collecting process of uranium oxides or plutonium oxides (liquid cathode):

$$U^{3+}+3e^- \rightarrow U; Pu^{3+}+3e^- \rightarrow Pu$$

(1) In the conventional heating method used for the melting of the spent nuclear fuel in the molten salt, the crucible is directly heated. As a result, the crucible acts as heat transmitting surface, and it turns to a corrosion environment at higher temperature than the melting temperature of the salt.
(2) The crucibles are directly exposed to chlorine gas, oxygen gas, etc. used in the pyrochemical reprocessing, and they make severe corrosion environment.
(3) Compared with induction current used in the conventional metal melting method, higher frequency is needed due to the difference in electric conductivity.
(4) It is generally practiced to adopt water-cooling method in order to cool down the crucible used for induction heating. However, when water is brought into contact with the molten salt by any chance, explosion may occur.
(5) In the conventional heating method, stirring means are required to evenly maintain temperature distribution of the molten salt, and this requires the designing of the entire system in more complicated structure.
(6) In the resistance heating method, the molten salt is evenly molten and evenly stirred up, and a cylindrical crucible must be generally adopted.

SUMMARY OF THE INVENTION

To solve the above problems, it is an object of the present invention to provide a method and a system, by which it is possible to improve corrosion-resistant property of the crucible and to contribute to the safety in the pyrochemical reprocessing method.

To attain the above object, the present invention provides a pyrochemical reprocessing method for spent nuclear fuel for melting the spent nuclear fuel in a molten salt placed in a crucible and by depositing the nuclear fuel, whereby the crucible is heated by induction heating, a cooling medium is supplied to cool down, and a molten salt layer is maintained by keeping balance between the heating and the cooling, and a solidified salt layer is formed on inner surface of the crucible.

Further, the present invention provides an induction heating system to be used in a pyrochemical reprocessing method for melting a spent nuclear fuel in a molten salt placed in a crucible and for depositing the nuclear fuel, wherein said induction heating system comprises means for induction heating, and cooling means for cooling by supplying a cooling medium to the crucible.

DETAILED DESCRIPTION OF THE PREFERRED EMBODIMENTS

Figure 1A:
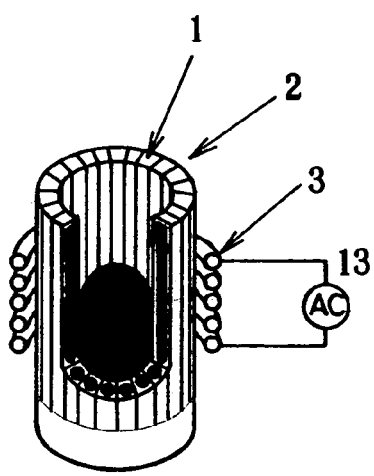
FIG. 1 represents schematical drawings each showing an induction heating system.

Description will be given below on embodiments of the present invention referring to the drawings.

Figure 1B:
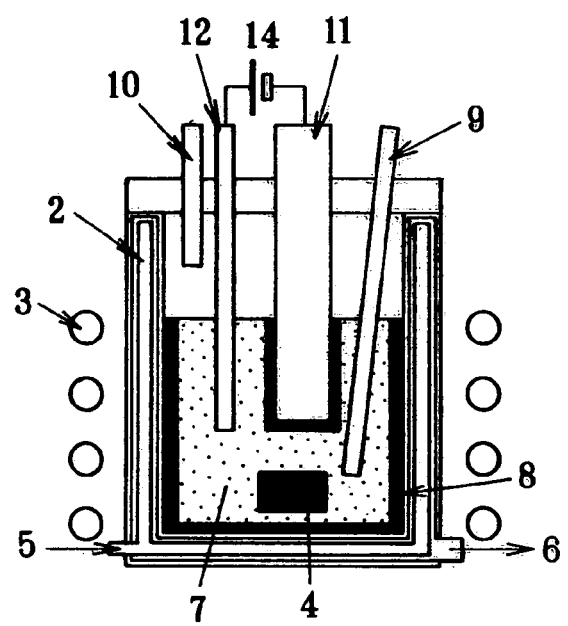

FIG. 1 represents schematical drawings each showing an arrangement of an induction heating system. FIG. 1(a) is a partially cutaway perspective view, and FIG. 1(b) is a cross-sectional view.

A crucible 2 divided by a segment 1 is placed in a high frequency induction coil 3, and magnetic field is applied directly on salt, which lies in molten state in the crucible. In melting the salt, an auxiliary heating member 4 made of conductive material is added as necessary. The crucible 2 is designed in such structure that its inner space is cooled down by using cooling media 5 and 6. By keeping balance between the heating power supplied from an AC power source 13 to the high frequency induction coil 3 and the cooling, a solidified salt layer 8 is formed in the boundary between the crucible 2 and the molten salt 7.

As the cooling media 5 and 6, fluid (liquid or gas) is used. To cool down the crucible, water-cooling method is generally used. However, when water is brought into direct contact with the molten salt by any chance, explosion may occur. To avoid the explosion, a cooling medium having a boiling point higher than the temperature of the molten salt or lower than operating temperature of the cooling medium is used. As the cooling medium having boiling point higher than the temperature of the molten salt, potassium (boiling point: 765.5° C.), sodium (boiling point: 881.1° C.), etc. may be used. As the cooling medium having a boiling point lower than the operating temperature, nitrogen (boiling point: −195.8° C.), helium (boiling point: −268.9° C.), etc. may be used.

One of the features of the present invention is that a solidified layer of salt is formed in the boundary between the crucible and the molten salt by keeping balance between electric power and cooling using an induction heating system. In the figure, reference numeral 9 is a gas blow pipe for blowing a process gas such as chlorine gas or oxygen gas. Numeral 10 denotes an off-gas exhaust pipe. A predetermined voltage is applied from a DC power source 14 to a cathode 11 and an anode 12, and electrolysis and recovery of the spent fuel are performed at the cathode 11.

Figure 2:
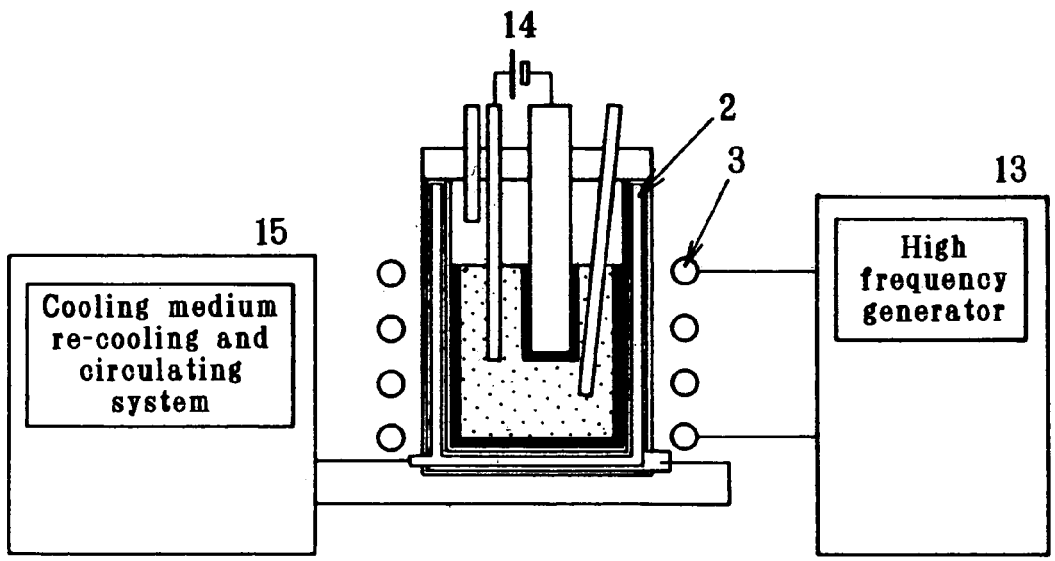
FIG. 2 shows an example of an arrangement of the induction heating system.

FIG. 2 shows an arrangement of the induction heating system.

The crucible 2 is placed in the high frequency induction coil 3. To this coil, high frequency power is supplied from a high frequency generator of the AC power source 13, and the salt in the crucible is molten. The cooling medium is supplied from a cooling medium re-cooling and circulating system 15 to the crucible 2. A solidified layer of salt is formed in the boundary between the crucible and the molten salt depending on the balance between the high frequency electric power for heating and the cooling.

For cooling the crucible, liquid or gas is used as described above. The salt used is a salt such as CsCl, NaCl, KCl, etc. or a mixed salt containing these salts. Melting point of KCl—NaCl mined salt of equal mole concentration is about 660° C. as an example of the salt used. When this salt is molten, surface temperature in the crucible is about 50° C. as an example of one test, and temperature gradient is generated in the solidified salt layer 8.

As described above, temperature gradient occurs when the solidified layer is formed. Thus, it is possible to decrease crucible temperature without cooling the molten salt except the solidified layer (while maintaining the molten state), and corrosion environment in the crucible can be alleviated. Also, by forming the solidified layer, it is possible to alleviate or avoid the condition where inner surface of the crucible is directly exposed to chlorine gas or oxygen gas. As a result, service life of the crucible material, i.e. the material of the heating system, can be extended.

Figure 3A:
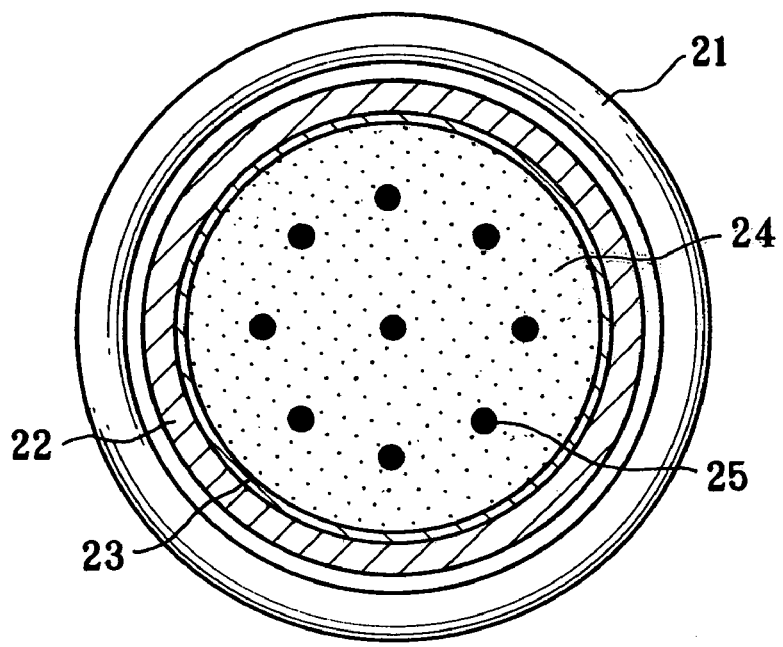
FIG. 3 represents drawings each showing an example of a crucible type heater designed in cylindrical shape.
Figure 3B:
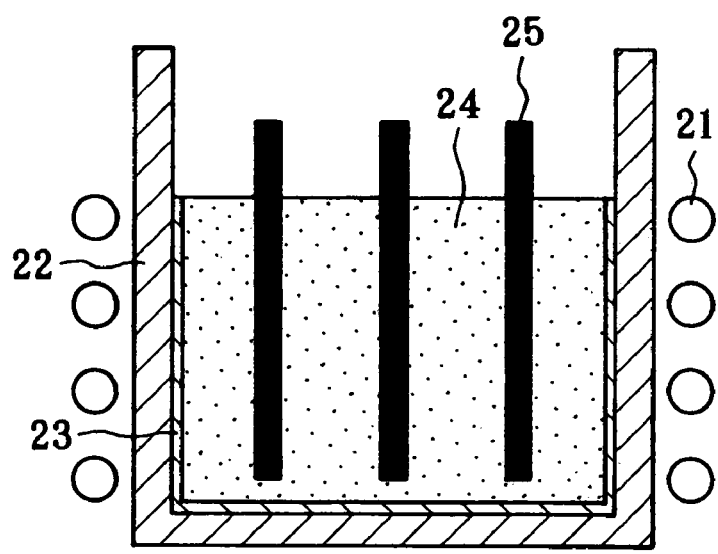
Figure 4A:
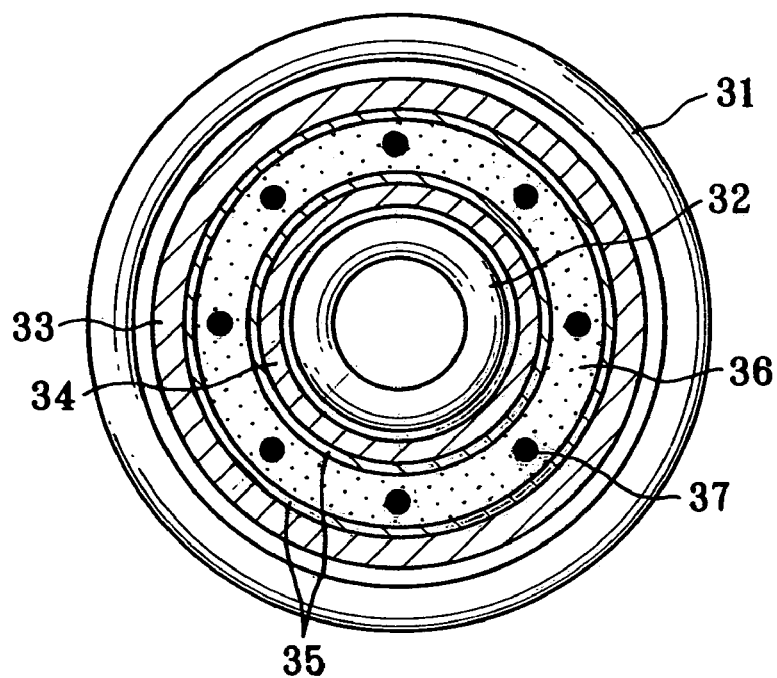
FIG. 4 represents drawings each showing an example of a crucible type heater designed in annular shape.
Figure 4B:
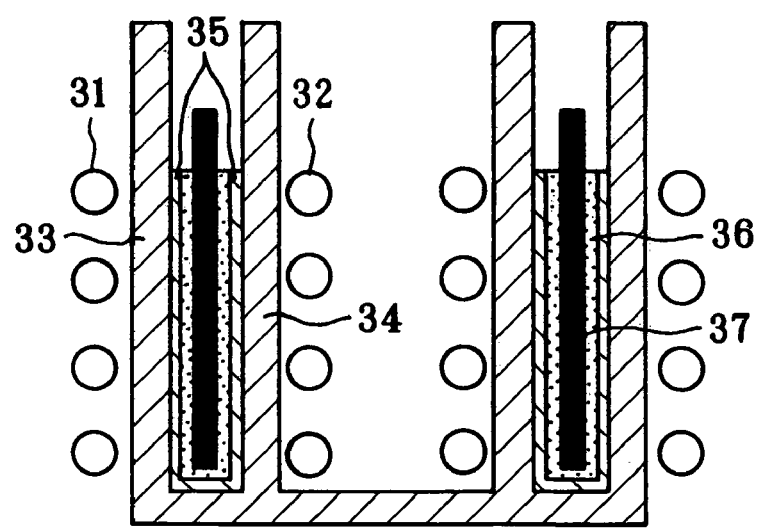
Figure 5A:
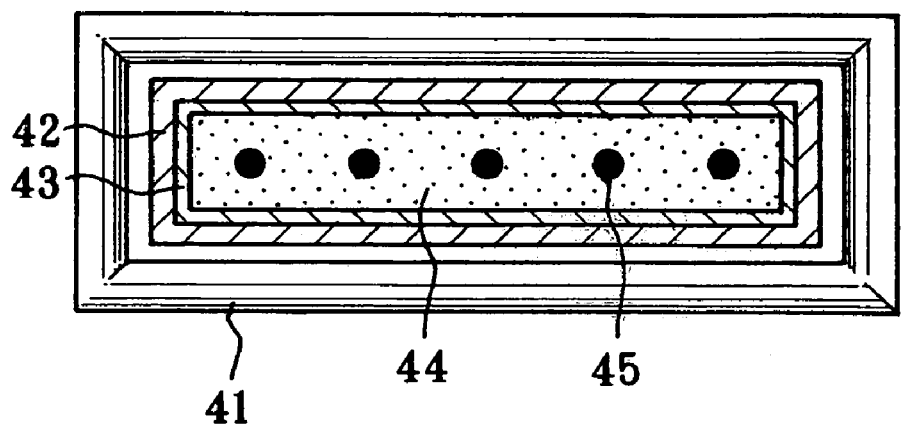
FIG. 5 represents drawings each showing an example of a crucible type heater designed in planar (rectangular) shape.
Figure 5B:
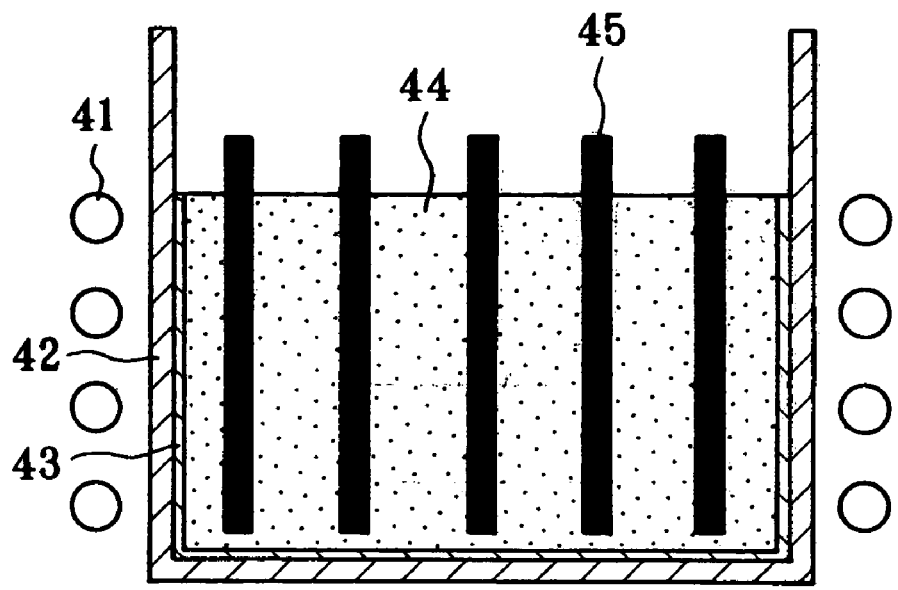

Next, various shapes of the crucible are shown in FIG. 3 to FIG. 5. In the following, no description will be given on the cooling system, while the solidified layer is formed by keeping balance between the heating electric power and the cooling in the same manner as described above.

FIG. 3 shows an example where the crucible is designed in cylindrical shape. FIG. 3(*a*) is a cross-sectional view, and FIG. 3(*b*) is a vertical sectional view.

A crucible 22 in cylindrical shape is placed inside a cylindrical coil 21. A solidified salt layer 23 is formed on inner wall surface of the crucible, while a molten salt layer 24 is maintained inside. To promote temperature increase, auxiliary heating members 25 made of conductive material are arranged inside the crucible.

FIG. 4 shows an example of a crucible in annular shape. FIG. 4(*a*) is a cross-sectional view, and FIG. 4(*b*) is a vertical sectional view.

An outer annular crucible 33 and an inner annular crucible 34 are arranged between an outer annular coil 31 and an inner annular coil 32, and a molten salt is placed between walls of the two annular crucibles. A solidified salt layer 35 is formed on inner wall surfaces of the outer and inner annular crucibles, and a molten salt layer 36 is maintained. To promote temperature increase, auxiliary heating members 37 made of conductive material are placed in the crucible.

FIG. 5 shows an example of the crucible designed in planar (rectangular) shape. FIG. 5(*a*) is a cross-sectional view, and FIG. 5(*b*) is a vertical sectional view.

A rectangular crucible 42 is arranged inside a rectangular coil 41. A solidified salt layer 43 is formed on inner wall surface of the crucible, while a molten salt layer 44 is maintained. To promote temperature increase, auxiliary heating members 45 made of conductive material are arranged in the crucible.

Figure 6A:
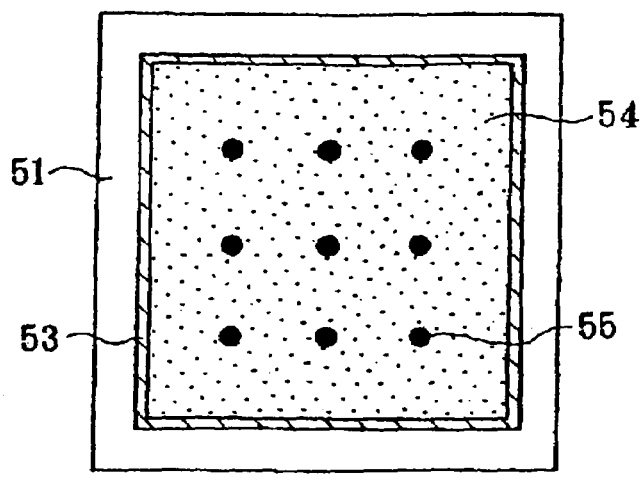
FIG. 6 represents drawings to show the crucible and induction heating coil integrated with each other.
Figure 6B:
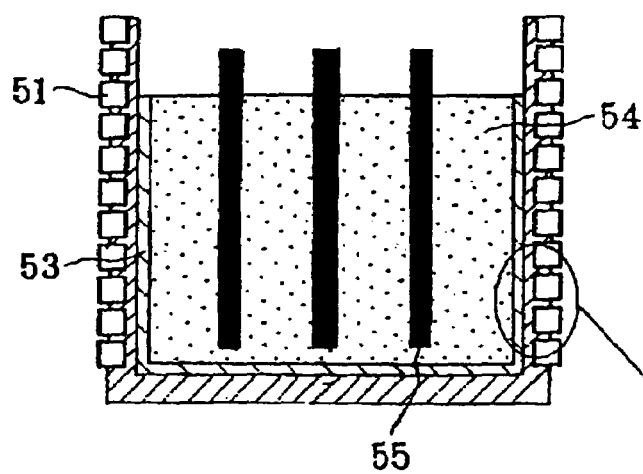
Figure 6C:
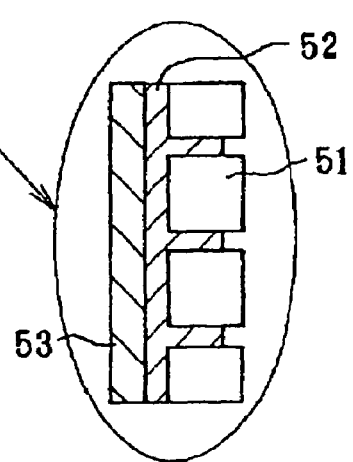

FIG. 6 shows an integrated example of a crucible and an induction heating coil. FIG. 6(*a*) is a cross-sectional view, FIG. 6(*b*) is a vertical sectional view, and FIG. 6(*c*) is a partially enlarged view.

In this embodiment, the crucible and the induction heating coil are integrated to increase the heating efficiency. A coating material is treated in gaps and on inner surface of a rectangular coil 51, and this is used as crucible 52. A solidified salt layer 53 is formed on inner wall surface of the crucible, while a molten salt layer 54 is maintained inside. To promote temperature increase, auxiliary heating members 55 made of conductive material are arranged in the crucible. As for the shape of the crucible coil, the shapes as shown in FIG. 3 to FIG. 5 or variations of these shapes, e.g. rectangular shape in dual structure as shown in FIG. 4, may be adopted.

According to the present invention, the following effects can be achieved:

(1) It is Possible to Decrease the Surface Temperature Inside the Crucible.

Table 1 summarizes a comparative example of surface temperature of inner wall of the crucible under direct heating (e.g. resistance heating) and induction heating when KCl—NaCl mined salt of equal concentration is used.

TABLE 1

| Heating mode | Direct heating | Induction heating |
| --- | --- | --- |
| Surface temperature in crucible | Higher than 660° C. | 50° C. |

As shown in Table 1, compared with the conventional direct heating method, it is possible for the induction heating method to cool down the surface in the crucible while maintaining the molten salt layer by the cooling system. As a result, corrosion environment like the conventional method can be extensively improved, and service life of the materials can be extended.

Figure 7:
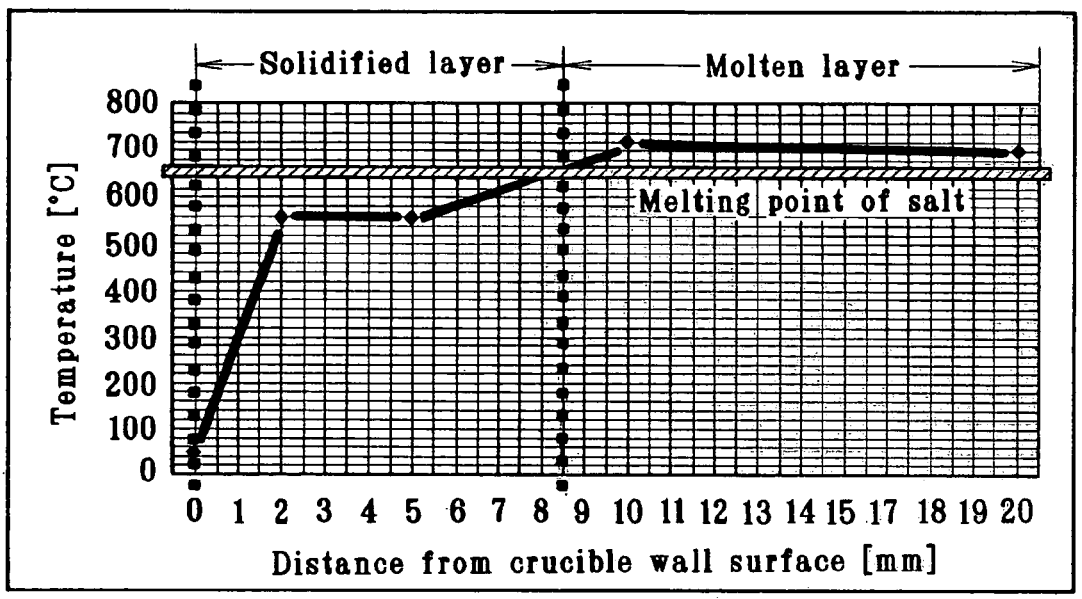
FIG. 7 is a diagram showing an example of formation of a solidified layer of salt.

(2) Immediate Contact to the Crucible Material of the Corrosive Elements is Prevented According to the Solidified Salt Layer An example of formation of the solidified salt layer is shown in FIG. 7. In FIG. 7, a distance (mm) from the wall surface of the crucible is represented on the axis of abscissa, and temperature (° C.) is shown on the axis of ordinate. From this diagram, it is evident that boundary between the solidified layer and the molten layer lies near the portion 8-9 mm from the wall surface of the crucible. By the presence of the solidified layer of salt, it is possible to avoid direct contact between the crucible wall surface and corrosive elements such as chlorine gas, or oxygen gas. As a result, corrosive conditions as seen in the conventional method can be extensively improved, and surface life of the materials can be extended.

(3) Promotion of Temperature Increase by the use of Auxiliary Heating Members

When salt is molten, it is necessary to have higher frequency because of the difference of electric conductivity compared with induction current used in the conventional metal melting. By arranging auxiliary heating members made of conductive material, it is possible to promote and accelerate temperature increase compared with the temperature increase of salt by the induction current as used in the conventional method for metal melting.

(4) Explosion Caused by the Contact of the Molten Salt with the Cooling Medium can be Prevented by the Adoption of a Cooling Medium Except Water.

To cool down a crucible used for induction heating, it is generally practiced to adopt water-cooling system. However, explosion may occur when the molten salt is brought into direct contact with water. By adopting a cooling system using a cooling medium except water, it is possible to avoid the danger such as explosion.

(5) Stirring Effect of Electromagnetic Force Generated by Induction Heating

Figure 8:
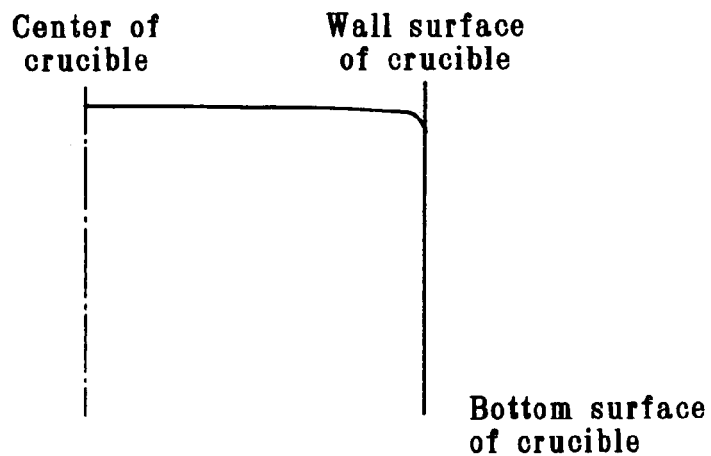
FIG. 8 shows free surface shape of a molten salt and distribution of electromagnetic force.

FIG. 8 represents an example, which shows by numerical analysis whether stirring effect is caused or not by generation of magnetic field due to the induction heating. The figure shows free surface configuration of the molten salt and distribution of electromagnetic force (distribution of electric power force and magnetic force) from the crucible center to crucible wall surface. The electromagnetic force is concentrated at the closer part to the crucible wall and gives higher effect. Due to unevenness of the electromagnetic force, electromagnetic stirring occurs, and this gives stirring effect.

(6) Diverse Crucible Shapes

In the resistance heating method, the molten salt is evenly molten and evenly stirred up, and a crucible in cylindrical shape is generally adopted. Because even melting and even stirring can be expected due to the stirring effect as described in (5) above, diverse crucible shapes as shown in FIG. 3 to FIG. 5 and other variations based on these shapes can be adopted.

(7) Application to other Systems and Devices in Addition to a Melting Crucible

By utilizing non-contact heating, which is one of the features of the induction heating method, it is possible to adopt the present method as the heating system in such applications as cathode processor or distillation cleaning of the used salt.

The invention claimed is:

1. A pyrochemical reprocessing method for spent nuclear fuel, comprising:
    heating a crucible containing a molten salt by induction heating,
    supplying a cooling medium to the crucible for cooling,
    maintaining a molten salt layer by keeping a balance between the heating and the cooling, wherein a solidified salt layer is formed on a wall surface in the crucible, and
    melting spent nuclear fuel in the molten salt in the crucible.

2. A pyrochemical reprocessing method according to claim 1, wherein a fluid except water is used as the cooling medium.

3. A pyrochemical reprocessing method according to claim 1 or 2, wherein auxiliary heating members are arranged in the crucible to promote temperature increase of the salt.

* * * * *